United States Patent Office 3,439,109

Patented Apr. 15, 1969

3,439,109

IMPROVEMENTS RELATING TO THIN FILM MAGNETIC STORES USING PRINTED ELECTRIC CIRCUITS

David Edward Birt, West Ealing, London, Anthony Thomas Gibson, Tilehurst, Reading, Peter John Holden, Rickmansworth, and Reginald Sidney Webley, Hayes, England, assignors to Electric & Musical Industries Limited, Hayes, Middlesex, England, a company of Great Britain Filed Sept. 28, 1962, Ser. No. 226,865
Claims priority, application Great Britain, Sept. 29, 1961, 35,059/61
Int. Cl. H05k *1/06*; G11b *5/74*; H02b *1/02*
U.S. Cl. 174—68.5 1 Claim This invention relates to printed electric circuits and to the manufacture of such circuits. The invention has especial though not exclusive reference to printed circuits used in thin film magnetic stores.

Various proposals have been made for the construction of so called thin film magnetic stores of large capacity, for use in digital computing equipment. However major problems arise in the construction of such stores from the very considerable number of connections which have to be made if the store is of any useful size. For example, thousands of soldered joints are involved in a typical store, and all these joints have to be carefully checked for continuity and for insulation from adjacent connections. Moreover the requirement of space economy conflicts with the need for access to some at least of the connections for servicing purposes, and it is also important to minimise unwanted couplings between different conductors of the store.

An object of the present invention is to provide an improved printed electric circuit and method of manufacturing such circuits with a view to facilitating quantity production of relatively complex circuits involving multiple connections between conductors as in a thin film magnetic store for example.

According to the invention there is provided a printed electric circuit comprising a first set of conductors adhering to the surface of insulating material, a second set of conductors adhering to the surface of other insulating material, the conductors of one set having portions arranged to register respectively with corresponding portions of the conductors of the other set, and said portions of the conductors of at least one set bridging a gap between two parts of the insulating material to which the conductors of said one set adhere, one set of conductors being applied to the other set so that said portions of one set register respectively with the corresponding portions of the other set without insulating material between the registering portions, and the registering portions of the respective conductors joined at said gap to establish electrical connections between the conductors of the two sets.

Figures 1, 1A:
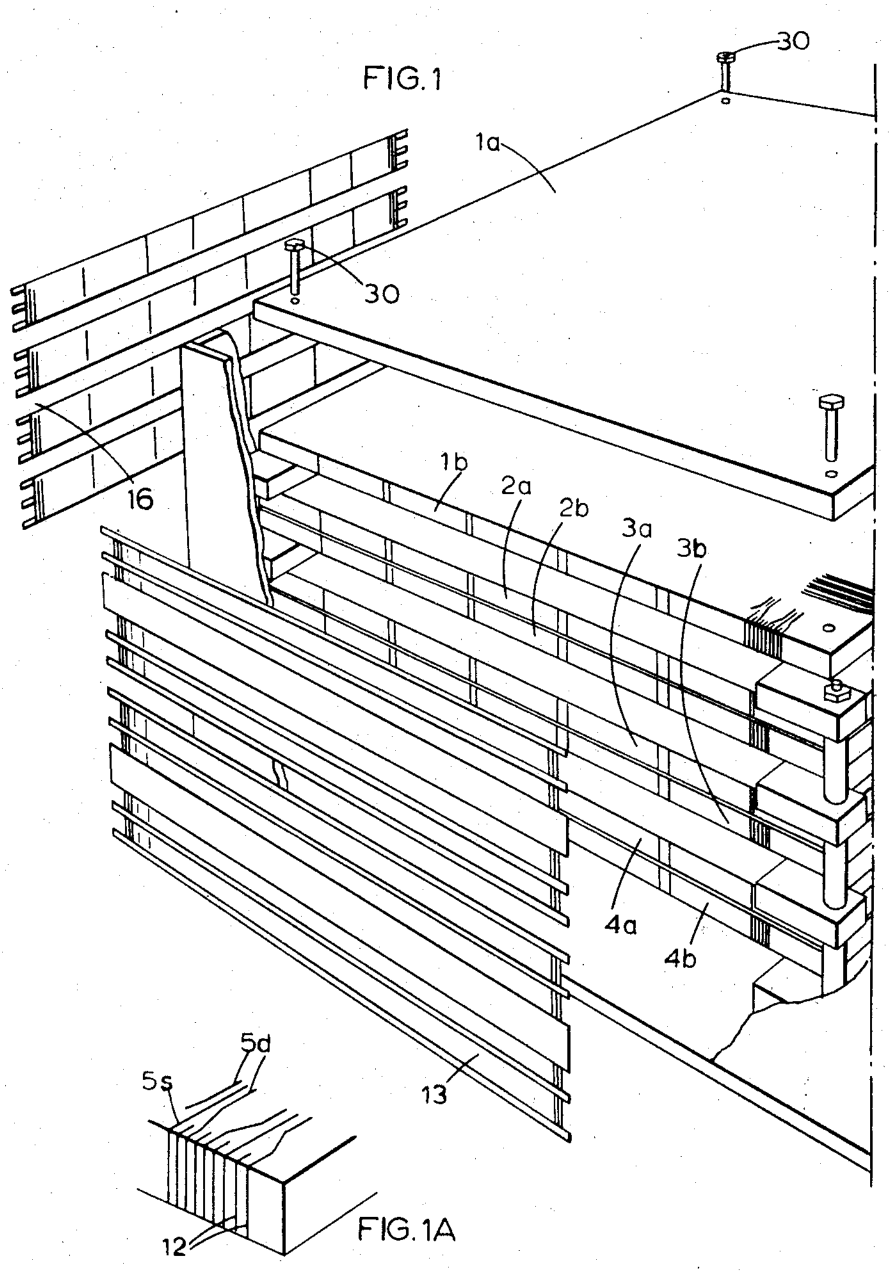
Figures 1, 2:
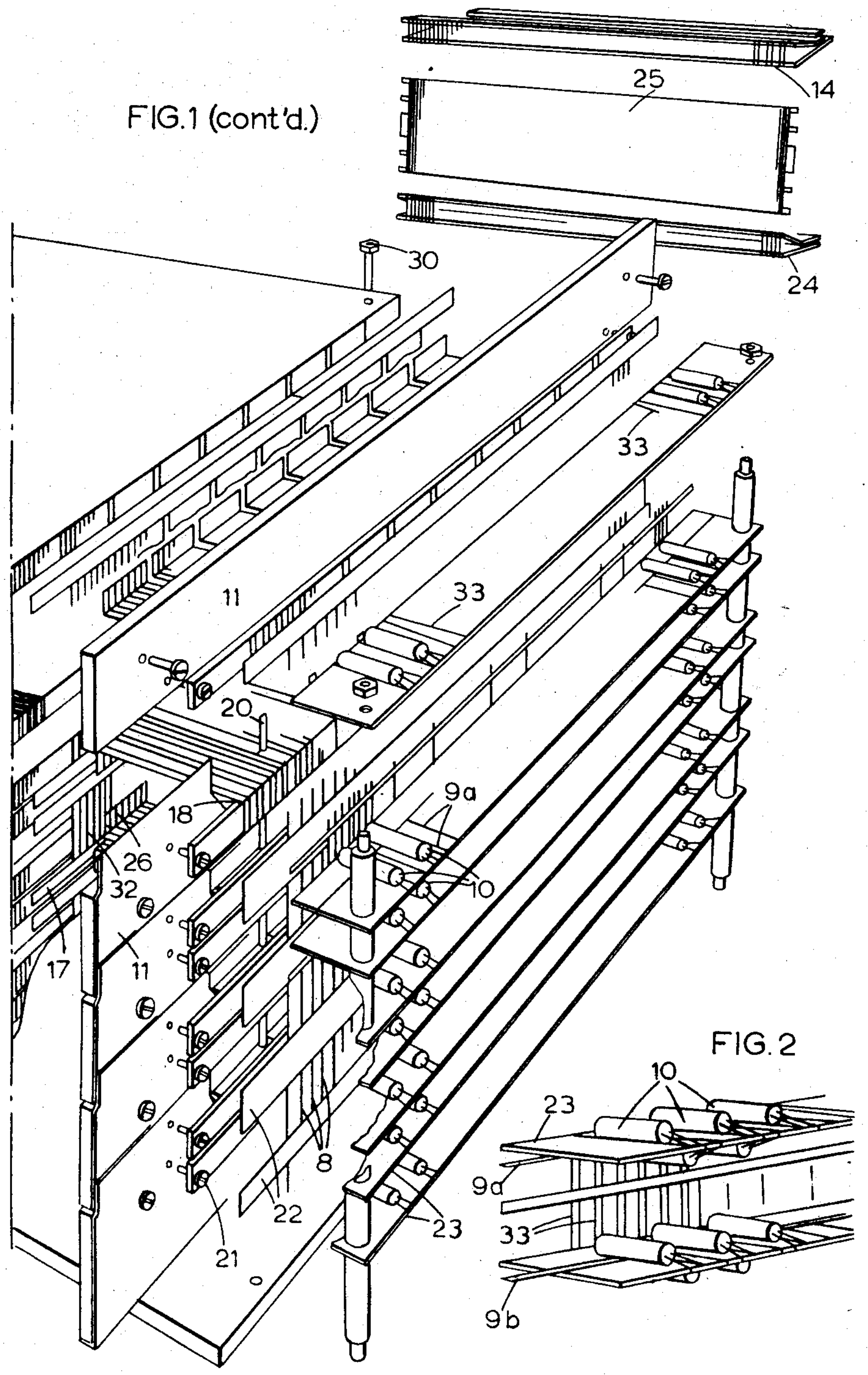
Figure 3:
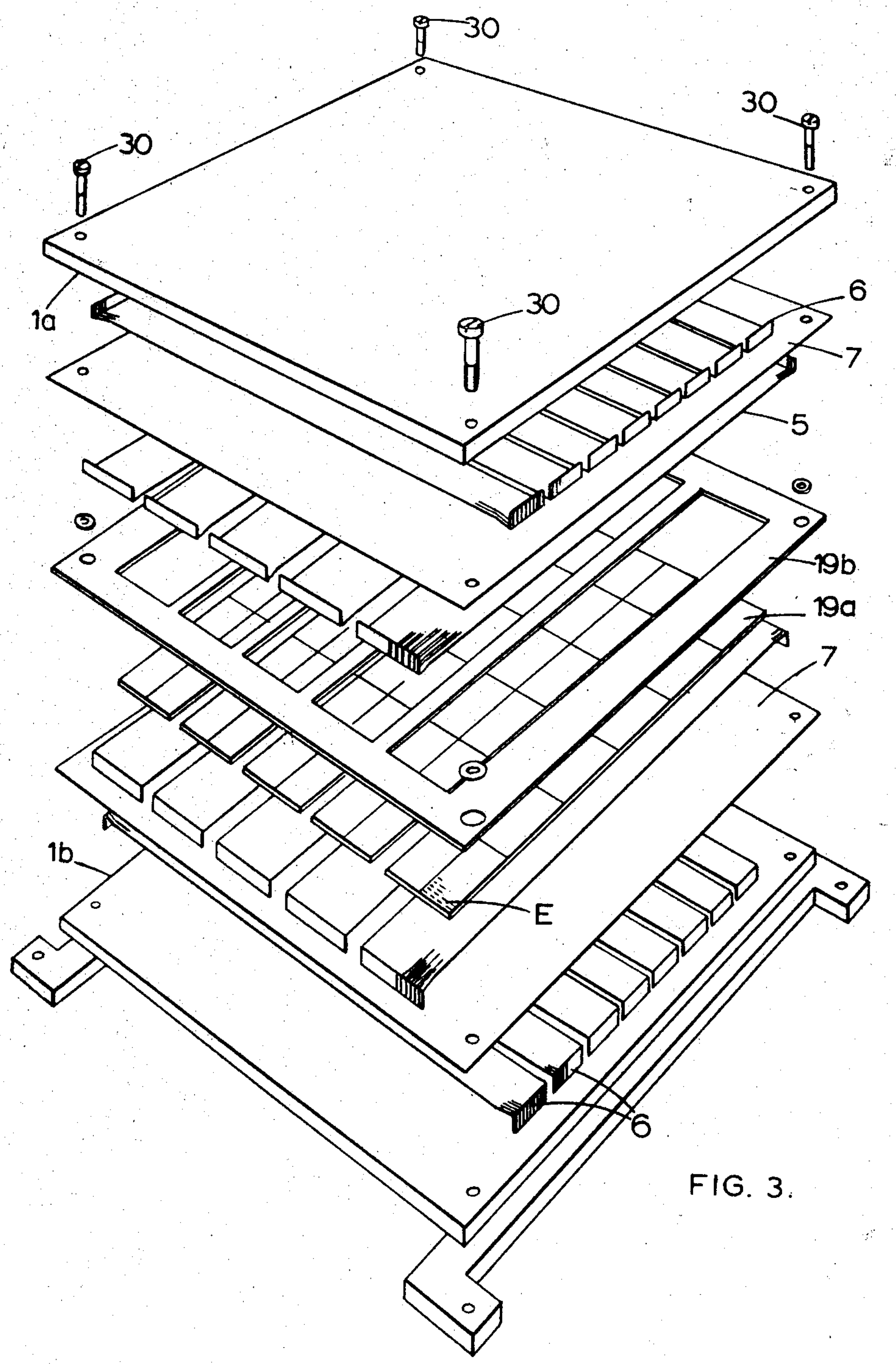
Figure 4:
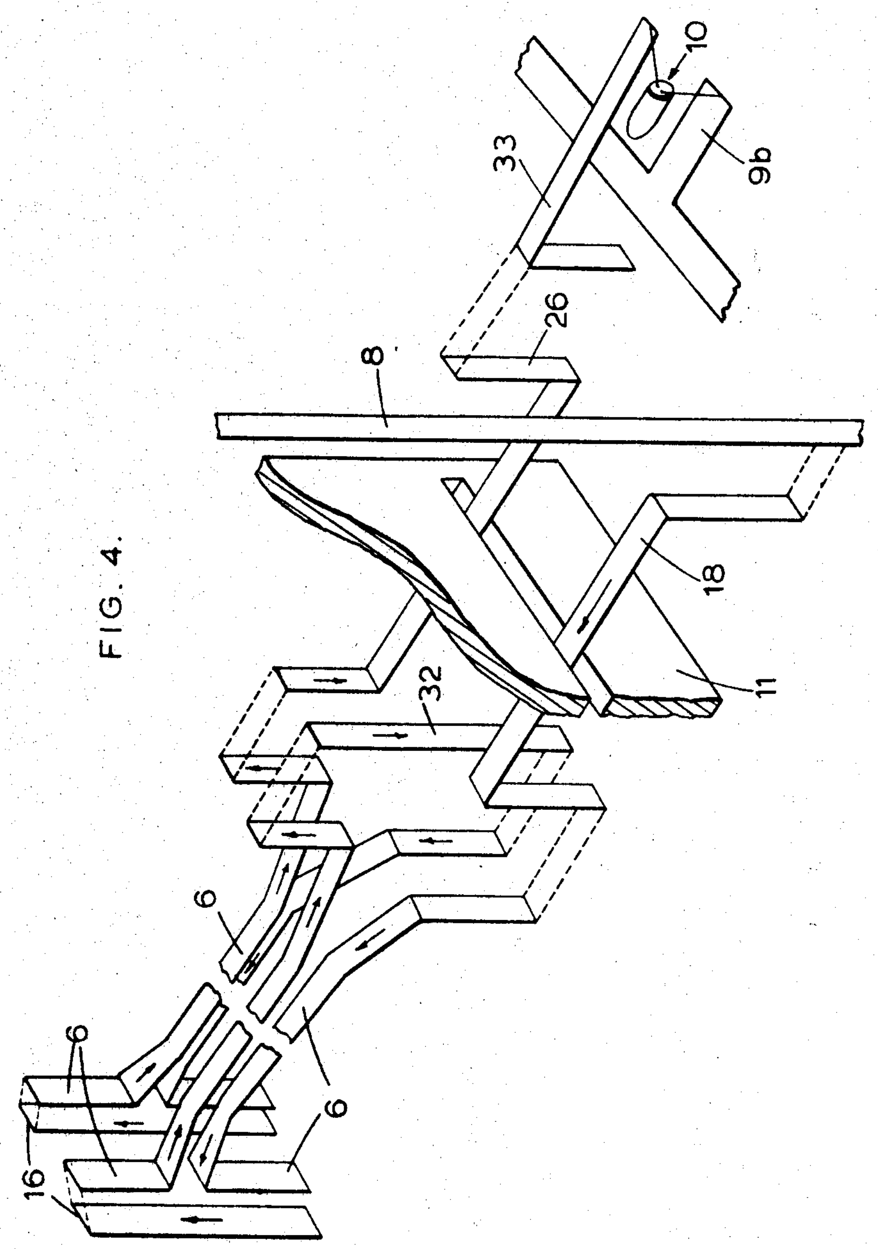
Figure 5:
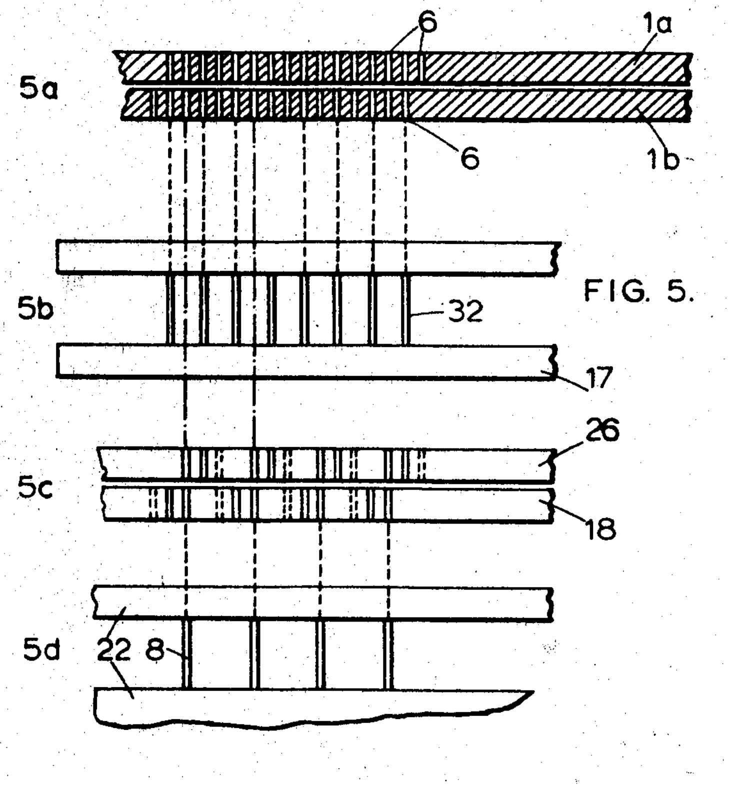
Figure 7:
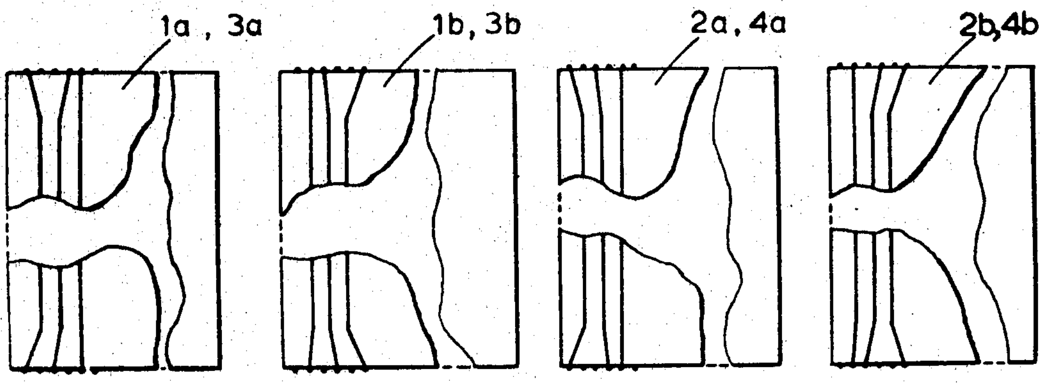
Figure 6:
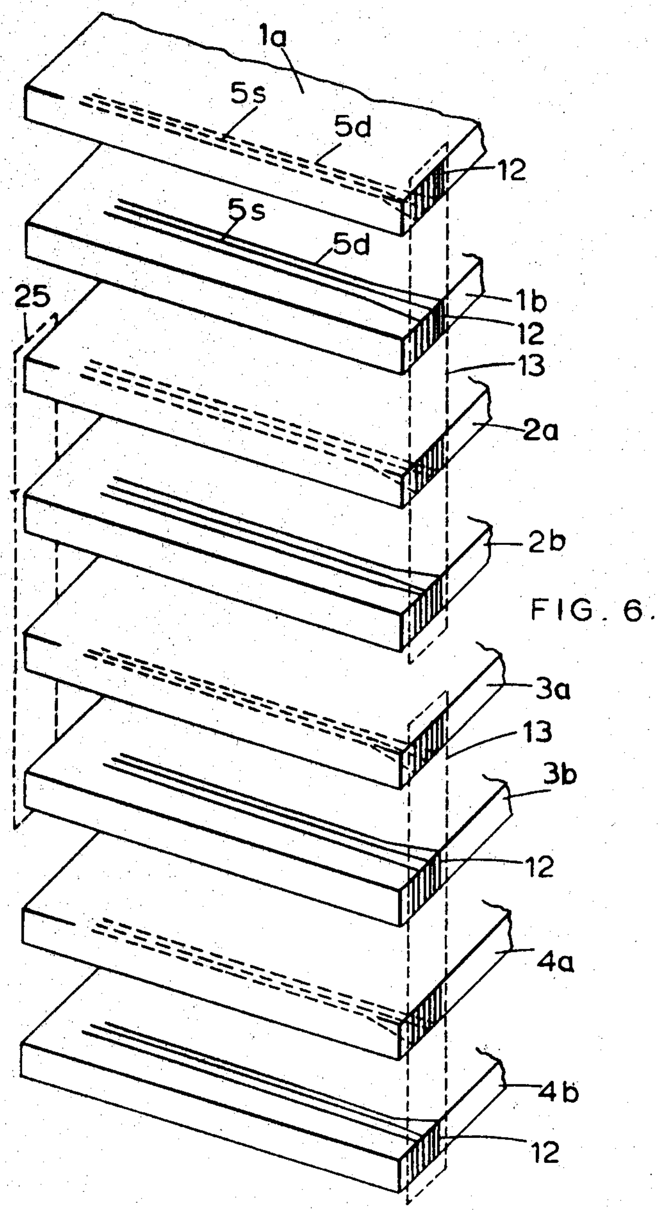
Figure 8:
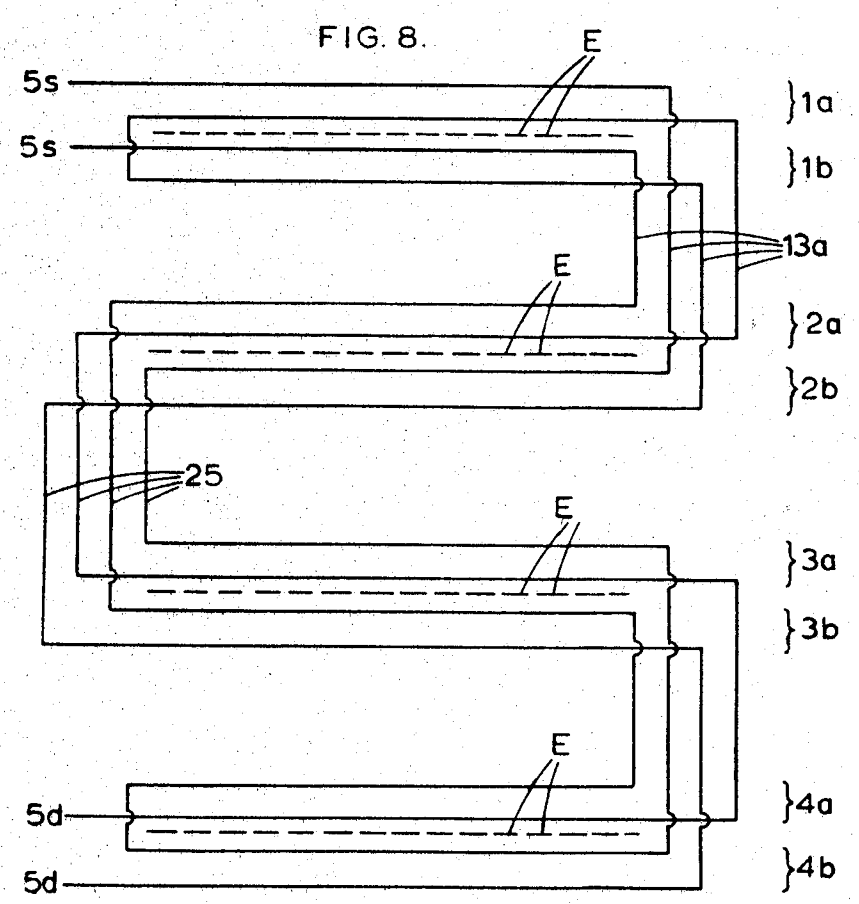
Figures 8A, 8B:
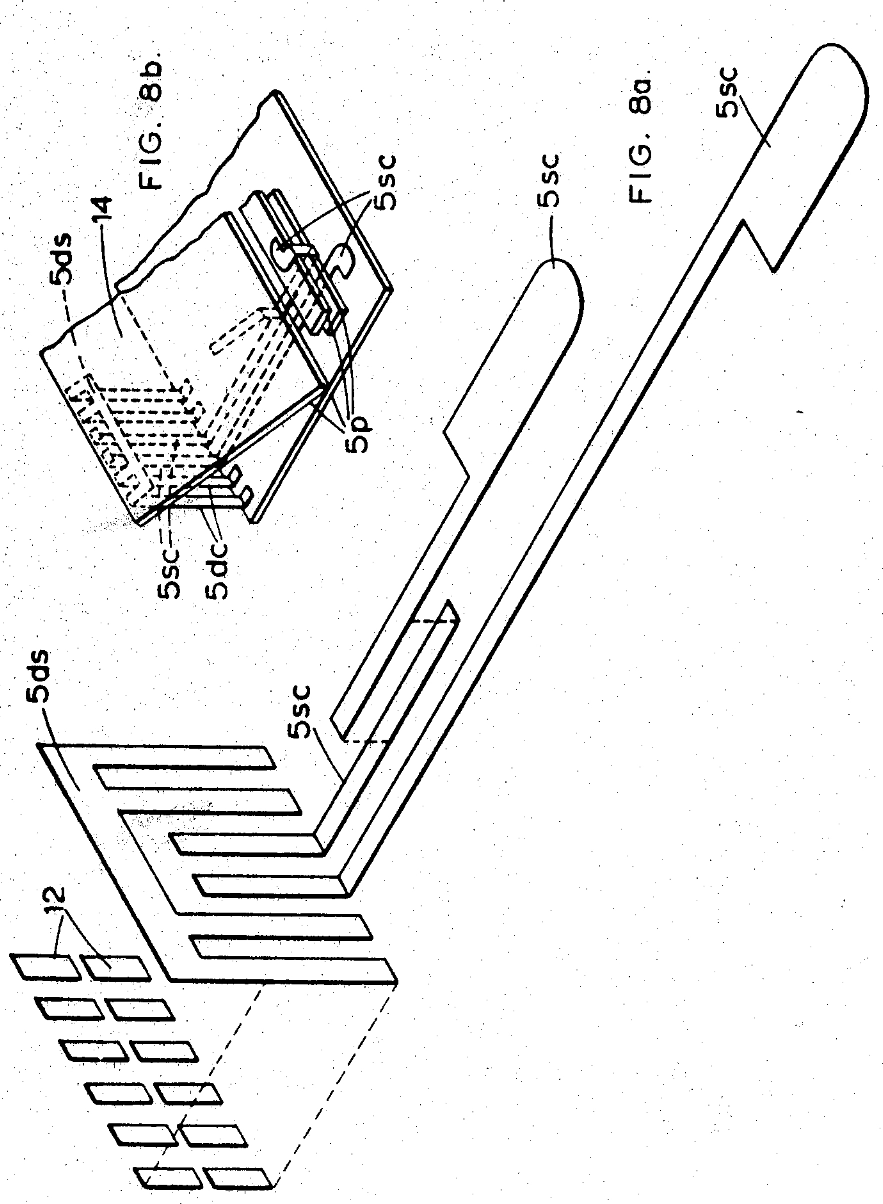
Figures 8C, 8D:
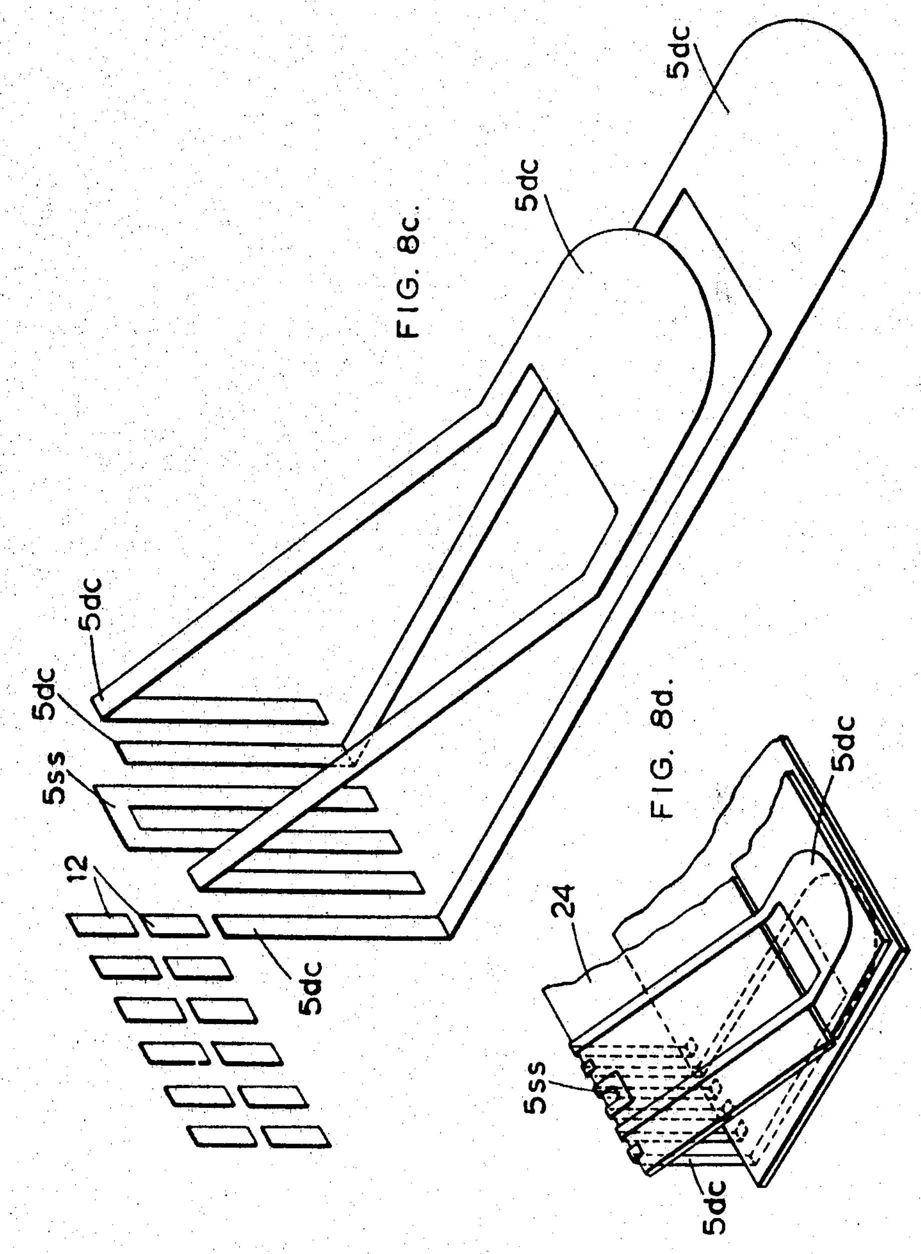
Figure 9:
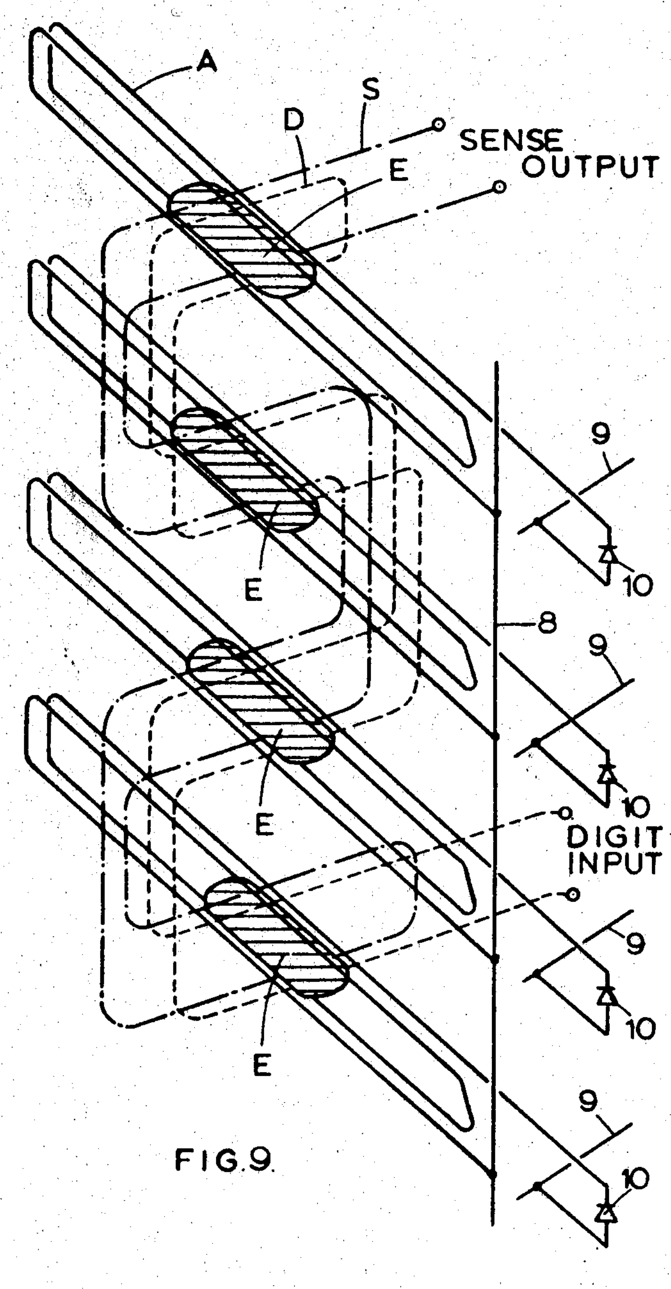

In order that the present invention may be clearly understood and readily carried into effect it will now be described more fully with reference to the accompanying drawings, in which:

FIGURE 1 illustrates a partially exploded and cut away diagram of a magnetic thin film store according to one example of the invention, FIGURE 1A being a detail of part of FIGURE 1, FIGURE 2 shows a part view of a pair of diode boards as illustrated in FIGURE 1, FIGURE 3 shows diagrammatically a single exploded memory plane from FIGURE 1, FIGURE 4 shows the interconnection of a single address loop, FIGURE 5 shows the interconnection and terminal connection of a group of address loops, FIGURE 6 shows the interconnection of digit and sense wires in the complete store, FIGURE 7 shows the layout of the multiple connectors for the digit and sense wires, FIGURE 8 shows the relative direction of digit and sense windings in the complete store, FIGURE 8*a* shows the connection of sense wires and the shorting of the digit wires on the top plane, FIGURE 8*b* shows the folded insulating support carrying the sense output terminals, FIGURE 8*c* shows the connection of the digit wires and the shorting of the sense wires on the bottom plane, FIGURE 8*d* shows the folded insulated support carrying the digit output terminals, FIGURE 9 is a phantom diagram showing the organisation of the address, digit, and sense wires in relation to four corresponding magnetic storage elements, one element on each of the four planes of the store.

In order to give a general picture of the store, the construction of which is illustrated in FIGURES 1 to 8, reference will first be made to FIGURE 9. The store comprises two hundred and fifty-six rows of magnetic elements, sixty-four rows to each plane, and there are fifty elements in each row. Each row of elements provides storage capacity for one word, the store being a word organised store in which each address winding is coupled with a row of magnetic elements. Four of the magnetic elements are represented in FIGURE 9 being denoted in that figure by the general reference E and the elements which are represented are corresponding elements of the four different planes of the store. Each of the elements is associated with a two-turn address winding A connected at one end to a vertical bus-bar 8 (which is common to the four planes) and connected at the other end to a horizontal bus-bar 9 via a diode 10. There are two horizontal bus-bars 9 for each plane although only one is shown in FIGURE 9 and each vertical bus-bar is common to two address windings in each plane. There is a separate address winding A for every row on each plane and there are thirty-two vertical bus-bars 8 and four pairs of horizontal bus-bars 9. A particular row (word location) in any one plane can be addressed by applying an appropriate potential difference between a selected vertical bus-bar and a selected horizontal bus-bar.

Each of the elements is also associated with two further windings, namely a digit winding D and a sense winding S. These windings are associated with the magnetic elements in columns, and the same sense and digit windings couple with corresponding columns in the four planes. There are, therefore, fifty digit windings D and fifty sense windings S each of which zig-zags from one plane to the next as represented in the case of one each of the windings S and D in FIGURE 9. FIGURE 9 thus indicates the configuration of four address windings A, a single digit winding D and a single sense winding S. The magnetic elements E are in the form of discrete thin magnetic film elements which are uni-axially anisotropic. They are roughly rectangular in shape having their longer dimensions aligned in the direction of the rows as indicated in FIGURE 9. The magnetic anisotropy is such as to produce a characteristic hysteresis loop which ideally approximates to a rectangle along axes which are aligned with the rows of the store, and substantially no hysteresis along axes aligned with the columns. In the store about to be described, each digit winding is composed of two parallel conductors lying respectively at opposite sides of the conductor which constitutes the respective sense winding but in order to simplify FIGURE 9, only one of the digit conductors is shown.

The mode of operation of the store such as has been briefly described is well known to those skilled in the art, and will not be considered, the invention being concerned primarily with the physical construction of the store and the method of manufacturing it. The conductors required to form the address, digit and sense windings are provided predominantly in the form of printed conductors or "wires" as they are hereinafter termed for simplicity, the term "printed conductor" or "printed wire" being used to denote a conductor which is adherent to the surface of insulating material. Such an adherent conductor can be produced by a variety of known methods for forming printed circuits and the invention is not in any way restricted to the method used for providing adherent conductors and such methods as are indicated in this specification are merely methods which are preferred for the particular conductors under consideration.

However, it is a feature of the invention that some of the printed circuits which are used comprise conductors which bridge a gap between two portions of insulating material to which the conductors adhere, whereby wholly exposed portions of the conductors are provided at the gap. Printed circuits such as these are used, as will appear, to facilitate the establishment of the multiple electrical connections which are required in the manufacture of the store. Such printed circuits are in some cases referred to as "ladders" in the following description, the bridging conductors forming "rungs" of the ladders. The ladders may be made in any suitable manner, for example by securing copper foil to two portions of insulating material by means of an adhesive so that the foil bridges a gap between these two portions, etching away unwanted portions of the copper foil to leave only the portions required to form the desired conductors, and (if desired) increasing the thickness of the conductors by electro-deposition onto them. During the etching and possibly also during the electro-deposition the copper foil bridging the gap may be supported by a temporary insulating support fitted into the gap in the insulating material and having if desired the surface nearer the copper foil coated with a release agent. Temporary support provided in this way is especially desirable if the insulating material to which the copper foil adheres is in the form of a relatively thick plate of insulating material, say glass, but may be unnecessary if the insulating material is in the form of thin flexible sheet material, say resin-impregnated fibre glass. As will appear moreover the two portions of insulating material at the sides of the gap bridged by the adherent conductors may be separated portions, or may be portions of a single plate or sheet, or board, the gap in this case being in the form of a slot.

In FIGURES 1 and 3 of the accompanying drawings, reference numerals 1*a*, 1*b* to 4*a*, 4*b* represent glass plates upon which are printed address wires 6 to form the address windings, the wires being arranged in eight groups of eight pairs of wires as shown. It will be noted on FIGURE 3 that the wiring is printed to extend over the front and rear edges of the plates and moreover, at the rear edges the wires are not taken out in pairs but each pair is splayed apart in order to render the rear contacts uniformly spaced. Moreover, this spacing is such that the wires at the rear edges of the plates 1*a*, 2*a*, 3*a* and 4*a* correspond exactly with the wires on the rear edges of plates 1*b*, 2*b*, 3*b* and 4*b*. Similarly the wires which are passing over the front edges of the plates are splayed apart to render them equally spaced but it will be seen from FIGURE 5 (which will be referred to later) that the wires on the plates 1*a*, 2*a*, 3*a* and 4*a* are displaced laterally with respect to the wires on the front edges of the plates 1*b*, 2*b*, 3*b* and 4*b* by one single wire place. Reference to FIGURE 4 shows the effect of this arrangement for one pair of wires 6. An insulating plate 7 made for example of resin impregnated fibre glass is now placed over the address wiring 6 on each plate 1*a* to 4*b*, and digit wires 5*d* and sense wires 5*s* to form the digit and sense windings are printed onto these plates 7 in triads forming five groups 5, of ten triads each.

Reference to FIGURE 1A of the drawings shows the arrangement of these triads and it will be seen that they are composed of two digit wires 5*d* on either side of a central sense wire 5*s*. Over the edges of plates 1*a* to 4*b* are printed five groups of equally spaced conductors 12 which are allocated to the triads in groups of six as shown in FIGURE 7. The reason for this arrangement will be described hereinafter. Between the plates 1*a* and 1*b* and similarly between the plates 2*a* and 2*b* through to 4*a* and 4*b* is located a frame 19*b* into which sections of substrate 19*a*, in this embodiment glass being used, are disposed as shown in FIGURE 3. Upon these sections of substrate 19*a* are deposited thin films of magnetic material to form magnetic elements of the store such as represented by E in FIGURE 9, in the present embodiment an alloy of approximately 80% nickel and 20% iron being used. The films are in the form of substantially rectangular dots in this example but may be deposited in the form of a continuous layer. Any known technique such as evaporation, plating or sputtering upon the substrate may be adopted for depositing the magnetic material, the deposition being effected under the influence of a magnetic field or other suitable aligning influence in order that the magnetic material so laid down shall display uniaxial anisotropy such as already referred to with the easy direction parallel to the address wiring. Plates 1*a*–1*b*, 2*a*–2*b*, 3*a*–3*b* and 4*a*–4*b* are now assembled together and secured by non-conductive bolts 30. The digit and sense wires are connected by means of two quadruple ladders 13 located on the left hand side of the store as shown in FIGURE 1, and a single quadruple ladder 25 on the right hand side of the store. A quadruple ladder is a ladder having a set of conductors bridging four gaps between portions of insulating material. The rungs of the quadruple ladders 13 and 25 are spaced to correspond to the edge conductors 12 of the sense and digit wires and the required connections are made by applying the ladders to the edges of the boards 1*a*, 1*b* etc. so the groups of ladders register with the respective edge conductors and by thereafter soldering the rungs to the edge conductors. At least one set of the conductors to be joined are pretinned and the soldering is performed by a roller bit which is rolled along the gap between the portions of insulating material to which the rungs of the ladder adhere, so that the many connections can be made easily and surely. Reference numerals 13 and 25 in FIGURE 6 represent parts of these ladders illustrated for convenience as dotted rectangles and the connections made to the conductors 12 at the edges of the boards by the rungs of the ladders are in accordance with the views shown in FIGURE 7 the lower edges of which are the front edges shown in FIGURE 6 and the left hand side of FIGURE 1. The splaying of the sense and digit wires so that they connect only to selected edge conductors 12 produces, when connections between different plates are effected by the rungs of the ladders, the configuration and direction shown in FIGURES 8 and 9 for the sense and digit wires.

Input and output connections for the sense and digit wires are shown in FIGURES 8*a* and 8*d* of the accompanying drawings, together with shorting links. Only the conductors are shown in these two figures, whereas in FIGURES 8*b* and 8*d* these conductors are shown printed as ladders on insulating material and then folded. The insulating material bears references 14 and 24 and these input and output connecting circuits are applied respectively between the plates 1*a* and 1*b* and between the plates 4*a* and 4*b* on the right hand side of the store as seen in FIGURE 1.

Input and output connections to both digit and sense windings are greatly facilitated by arranging larger tabs at the outer ends of the connectors 5*sc* and 5*dc*. Moreover, both connection boards 14 and 24 may be roll-soldered to the edge connections 12, the method being hereinafter described. For simplicity only a single digit and sense winding is shown positioned for connection, but it must be understood that the conductors of 8*a* are provided for every digit and sense winding triad across the plates 1*a* and 1*b*, and that of 8*c* for every digit and sense winding across the plates 4a and 4b. When FIGURES 6, 7 and 8 are considered together, it will be appreciated that the winding arrangement shown in FIGURES 8 and 9 results for each digit and sense winding. The two digit wires of each triad always lie on opposite sides of the sense wire. FIGURE 8b shows a convenient layout for printing all the conductive portions of FIGURE 8a in a single operation. A similar layout is used for FIGURE 8c and is shown in FIGURE 8d. Reference numeral 5p indicates insulating material. The connecting boards are printed flat, and then folded to the shape shown after being soldered to the conductors 12. A general arrangement of the connection boards 14 and 24 is shown in FIGURE 1. The conductors are mainly on the inside of the board 14 after folding and the conductors are on the outside of the board 24 after it is folded. In FIGURES 8b and 8d the dotted lines indicate the position of conductors which lie beneath the insulating material. The upper sense connector 5sc is printed in two parts which are soldered together as shown. The sense wires 5s are used to carry the output signal picked up from each element E while the digit wires 5d are used for writing information which is stored in the elements E.

The address wiring is connected in the form of two turn windings, one such winding being shown in FIGURE 4. At the rear of the store as shown in FIGURE 1, double ladders 16 join the address wiring between respective pairs of plates 1a and 1b through to 4a and 4b. At the front of each memory plane or pair of plates, the address wires come out with the upper set displaced one wire place as hereinbefore described. The second, fourth and subsequent even numbered lower wires are connected to the first, third and subsequent odd numbered upper wires by a ladder 32 shown in FIGURES 1, 4 and 5, the insulating material of the ladder being denoted by reference 17. The first, third and subsequent odd numbered lower address wires are now connected to risers 18 and the second, fourth and subsequent even numbered address wires on the upper plates 1a, 2a, 3a and 4a are connected to risers 26. The risers are made in the form of ladders and then folded so that the insulating material at the sides is at right angles to the rungs. The riser 18 of one loop and the riser 26 of the next loop come into close proximity as can be envisaged by considering another two turn loop situated next to the loop shown in FIGURE 4 and these risers are therefore, separated from one another by a thin strip of insulating material which for clarity has not been shown in the drawings. Moreover, it will be seen from considering FIGURES 1 and 5a that the conductors on riser 18 are splayed into pairs at the front edge of the riser and pass through a gap in a copper screen 11. Riser 26 is also so arranged as to pass through the same gap. This copper screen 11 is furnished with lugs 20 which pass between groups of eight conductors. These lugs serve to reduce the loss of screening effect which arises when the copper screen is broken by a continuous aperture. The conductors on risers 26 are also splayed as shown in FIGURE 5c the double dotted lines showing their original position where they contact the conductors 6 on the plates, so that the first conductor of riser 26 lines up with the second conductor of riser 18 while the second conductor of riser 26 falls into the place between the first and second pair of conductors in riser 18. Between the pairs of conductors on the front edge of each riser may be printed dummy contacts which for the sake of clarity are not herein shown, but the purpose of which will be described later. Where there is coincidence between conductors on risers 18 and 26 these are connected to a ladder of straight conductors 8 which constitute the vertical address busbars and are printed in the form of a quadruple ladder upon a support of insulating material 22. The conductors in each one of a pair of risers 18 and 26 which fall opposite the spaces between pairs of conductors in the other riser (as shown in FIGURE 5c) are connected in pairs to the conductors 33 on a further ladder 23 shown best in FIGURE 2. Alternate pairs of conductors are connected via pairs of diodes 10 to the bus-bars 9a and 9b. Thus one pair of conductors (one on riser 18 and one on riser 26) are connected to the upper bus-bar 9a, the next pair of conductors (one on riser 18 and one on riser 26) are connected to the lower bus-bar 9b and so on alternately. Thus if dummy conductors are incorporated in the risers 18 and 26 and connected to conductors 33 greater mechanical strength and a more durable electrical contact results. The reason for bringing the conductors from risers 18 and 26 out in pairs alternately to the busbars 9a and 9b is that, were all the connections made either from the side of the riser 18, or from the side of the riser 26, then a voltage would be present upon the address wiring on the appropriate side of the memory plane and would result in spurious pulses arising through capacity pick-up with that plate. Thus, when a particular address winding is energised, the appropriate vertical busbar is connected to one terminal of a potential source, and the appropriate horizontal bus-bars 9a or 9b is connected to the other terminal of the source. As previously stated for clarity in FIGURE 9 only a single horizontal bus-bar is shown for each plane and is denoted by reference 9.

The pairs of wires 33 which contact the aforementioned alternate pair of conductors are splayed on the insulating boards 23 in order that they are equi-spaced at the front edges of boards 23, and are interleaved with the branches of horizontal bus-bars 9a and 9b which are printed on the opposite side of the boards 23 from the conductors 33. Between each of the branches of bus-bars 9a or 9b and the conductors 33 the diodes 10 are connected in accordance with the layout shown in FIGURE 2. The object of these diodes is to ensure the efficient working of the store by preventing current flowing in the reverse direction between the bus-bars 9a or 9b and 8 through the address loops. In practice a resistance is also connected across each address winding but such resistances are not shown in the drawing.

In the construction of the complete store it will now be readily apparent that both the interconnections to the address windings and the interconnections to the digit windings are made between straight and parallel portions of conductors. Each of these straight conductors as one of a plurality of conductors printed onto insulating material, parts of the material being omitted or removed where it is intended to make a connection, so as to form a kind of ladder, the conductors forming rungs between strips of insulating material. At least one of the surfaces to be joined is tinned and the conductors which are intended to be joined are aligned, this alignment being facilitated by printing the straight conductor of the ladder slightly narrower than the contacted conductors or tabs. After alignment a resin-alcohol, or similar noncorrosive flux is applied and soldering is accomplished by the application of a heated roller. In the case of the interconnection of the address wiring, for example the risers 18 and 26, or the connection boards 14 and 24 the ladders are folded into the required form after the soldering operation. Moreover, it can clearly be seen that risers 18 and 26 and ladder 32 may be produced from a single printed circuit which is subsequently folded to shape. After assembly by a roller iron there remain a number of soldering operations to be completed in order to attach the diodes 10 to their boards 23. This arrangement is, however, considered advantageous as it lends itself to the ready replacement of subsequently faulty devices.

What we claim is:

1. A printed electric circuit comprising a first set of conductors adhering to the surface of a first support of insulating material, said conductors having straight and parallel portions, a second set of conductors adhering to the surface of a second support of insulating material, said latter conductors having straight and parallel portions, a third set of conductors adhering to the surface of a third support of insulating material, said last mentioned conductors having straight and parallel portions, said straight and parallel portions of said third set being arranged to register respectively with the straight and parallel portions of at least selected conductors of the first set and at least selected conductors of the second set, at least part of certain of said straight and parallel conductor portions bridging a common gap between parts of the respective supports so that they are not covered by insulating material when in contact with the respective conductor on another support, the conductors of the third set being applied to conductors of the first and second sets, so that the straight and parallel portions of conductors of the third set register respectively with the straight and parallel portions of conductors of the first and second sets without insulating material between the registering portions, the registering conductor portions being joined at the gap to establish electrical connections between conductors of the sets.

References Cited

UNITED STATES PATENTS

| | | | |
|---|---|---|---|
| 2,974,284 | 3/1961 | Parker | 174—68.5 |
| 2,998,475 | 8/1961 | Grimsinger | 174—68.5 |
| 3,030,612 | 4/1962 | Ruben et al. | 340—174 |
| 3,196,522 | 7/1965 | Bernstein et al. | 340—174 |
| 3,257,649 | 6/1966 | Dietrich et al. | 340—174 |
| 3,159,821 | 12/1964 | Rossing | 340—174 |
| 3,053,929 | 9/1962 | Friedman | 174—68.5 |

STANLEY M. URYNOWICZ, *Primary Examiner.*

U.S. Cl. X.R.

340—174; 317—101